(No Model.)
J. E. TERRY.
HITCHING DEVICE.
No. 489,510. Patented Jan. 10, 1893.
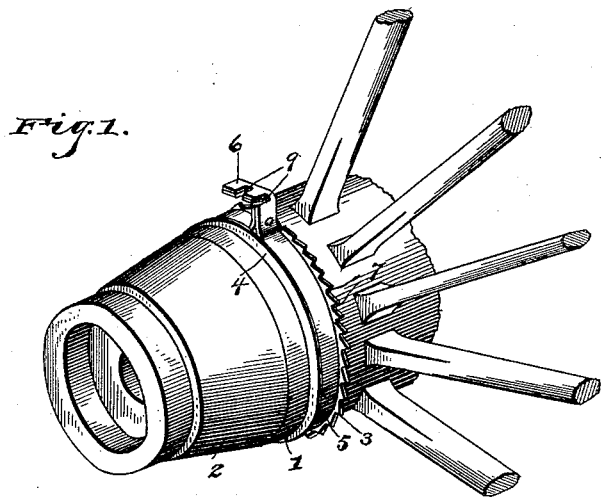
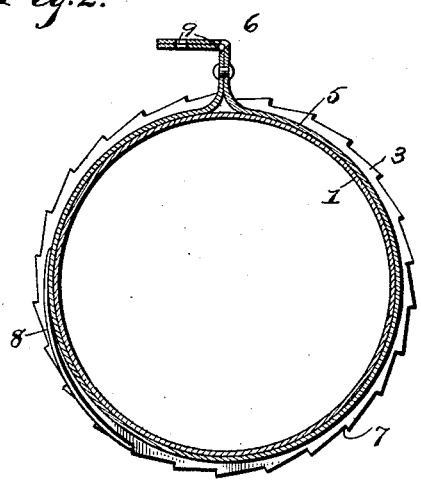 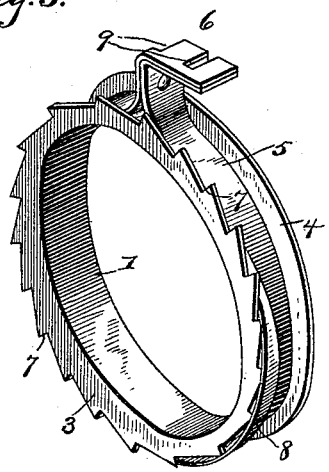
Witnesses
B. S. Ober
H. P. Riley
Inventor
J. E. Terry,
By his Attorneys,
C. A. Snow & Co.

UNITED STATES PATENT OFFICE.

JACOB E. TERRY, OF HECLA, MONTANA.

HITCHING DEVICE.

SPECIFICATION forming part of Letters Patent No. 489,510, dated January 10, 1893.

Application filed September 9, 1892. Serial No. 445,455. (No model.)

*To all whom it may concern:*

Be it known that I, JACOB E. TERRY, a citizen of the United States, residing at Hecla, in the county of Beaver Head and State of Montana, have invented a new and useful Hitching Device for Vehicles, of which the following is a specification.

The invention relates to improvements in hitching devices for vehicles.

The object of the present invention is to provide a hitching device adapted to be attached to the wheel of a vehicle to receive the reins, and capable of being actuated by forward rotation of the wheel to draw the reins, and thereby stop the animal.

The invention consists in the construction and novel combination and arrangement of parts hereinafter fully described, illustrated in the accompanying drawings and pointed out in the claim hereto appended.

In the drawings—Figure 1 is a perspective view of a portion of a wheel provided with a hitching device constructed in accordance with this invention. Fig. 2 is a longitudinal sectional view. Fig. 3 is a detail perspective view of the hitching device detached.

Like numerals of reference indicate corresponding parts in all the figures of the drawings.

1 designates a band fixed to the hub 2 of a wheel and provided at its inner and outer edges with annular flanges 3 and 4 and having mounted on it an adjustable band 5 arranged between the flanges 3 and 4 and having its ends forming an extension 6. The inner annular flange 3 is provided with a series of ratchet teeth 7 arranged to be engaged by a spring actuated or resilient pawl 8 mounted on the adjustable band and holding the same rigid with the fixed band 1 against a rearward rotation, whereby a forward rotation of the band 1 will carry the adjustable band with it. A hitching device is designed to be secured to each front wheel of a vehicle, and the extension 6 is provided with rein receiving recesses 9, whereby the reins are attached to the adjustable band. The inner and outer peripheral flanges 3 and 4 form a circumferential depression or trough to receive the adjustable band and the reins (not shown) to prevent the latter slipping off the hub.

It will be seen that the hitching device is simple and inexpensive in construction, and that as soon as a horse attempts to start the reins will be pulled back to stop it.

The outer portion of the rein receiving extension is bent at right angles to the inner portion and is disposed approximately parallel with the bands.

What I claim is—

A hitching device comprising a cylindrical band adapted to be fixed to the hub of a wheel and provided at its inner and outer edges with parallel annular peripheral flanges forming at the exterior of the band a circumferential depression or trough, one of said flanges having a series of ratchet teeth, an adjustable band arranged on the exterior of the cylindrical band in the trough or depression between the flanges and provided with a pawl engaging said ratchet teeth, and an extension carried by the movable band and provided with rein receiving recesses, substantially as described.

In testimony that I claim the foregoing as my own I have hereto affixed my signature in the presence of two witnesses.

JACOB E. TERRY.

Witnesses:
 O. H. SMITH,
 C. P. GIST.